United States Patent [19]

Kimberley et al.

[11] Patent Number: 4,601,270

[45] Date of Patent: Jul. 22, 1986

[54] METHOD AND APPARATUS FOR TORQUE CONTROL OF AN INTERNAL COMBUSTION ENGINE AS A FUNCTION OF EXHAUST SMOKE LEVEL

[75] Inventors: John A. Kimberley, East Granby; Robert H. Bullis, Avon, both of Conn.

[73] Assignee: United Technologies Diesel Systems, Inc., Springfield, Mass.

[21] Appl. No.: 566,001

[22] Filed: Dec. 27, 1983

[51] Int. Cl.$^4$ .............................................. F02M 39/00
[52] U.S. Cl. ...................................... 123/357; 123/494
[58] Field of Search ............... 123/357, 358, 359, 446, 123/494

[56] References Cited

U.S. PATENT DOCUMENTS

| | | | |
|---|---|---|---|
| 3,202,161 | 8/1965 | Richards | 123/359 |
| 3,744,461 | 7/1973 | Davis | 123/357 |
| 4,223,654 | 9/1980 | Wessel | 123/358 |
| 4,357,920 | 11/1982 | Stumpp | 123/446 |
| 4,368,705 | 1/1983 | Stevenson | 123/357 |

FOREIGN PATENT DOCUMENTS

| | | | |
|---|---|---|---|
| 0156218 | 12/1980 | Japan | 123/357 |
| 0159526 | 12/1981 | Japan | 123/357 |
| 0072634 | 4/1983 | Japan | 123/357 |

Primary Examiner—Carl Stuart Miller
Attorney, Agent, or Firm—Stephen A. Schneeberger

[57] ABSTRACT

A method and apparatus are provided for controlling the torque or fuel quantity limit to an internal combustion engine such as a diesel engine, at least partly as a function of the sensed level of smoke in the exhaust gas stream of the engine. An open-loop preliminary fuel quantity limit signal is provided as a function of engine speed. The actual smoke level is compared with a smoke limit value for the particular operating condition, and an error signal indicates the sense and possibly the magnitude of any difference. The error signal is the basis of a compensating signal which is added to the open-loop preliminary fuel quantity limit signal such that the resulting fuel quantity limit signal provides for maximum torque without exceeding the smoke limit. The smoke level is obtained by a direct measurement of the particulate level or the like in the exhaust gas stream. An alarm may be provided for indicating when the actual smoke level exceeds some threshold relative to the smoke limit.

11 Claims, 7 Drawing Figures

METHOD AND APPARATUS FOR TORQUE CONTROL OF AN INTERNAL COMBUSTION ENGINE AS A FUNCTION OF EXHAUST SMOKE LEVEL

TECHNICAL FIELD

The invention relates to a method and apparatus for controlling the torque of an internal combustion engine and more particularly to an improvement in such controls. More particularly still, the invention relates to improved torque control of an engine at least partly as a function of the particulate or smoke level in the engine's exhaust.

BACKGROUND ART

Internal combustion engines, and particularly diesel or compression-ignition engines, characteristically contain some level of particulates in their exhaust gas effluent. This particulate may include fine droplets of liquid, partially burned fuel and solid particles such as carbon. Further, particulates which are sufficiently large and translucent or opaque as to be visible to the human eye are typically referred to as "smoke". The existence of such particulates in the form of smoke may be objectionable for a variety of reasons, including aesthetics. Accordingly, various governmental agencies and/or automobile and truck manufacturers have imposed or may be expected to impose, limits on the quantity or level of smoke or particulates emitted by a particular engine. As used in the present application, the phrases "particulates" and "smoke" will be used interchangeably.

In the laboratory, various systems exist for identifying and/or quantifying the level of smoke emitted by an internal combustion engine. In one such system a standard volume of exhaust gas is passed through a standard fabric patch and the resulting degree of darkening or opacity of the patch as a result of the exhaust smoke is measured optically and expressed in units of Bosch. Although such measurements are typically made in a test cell on a batch basis, it will be appreciated that continuously operative sensing systems of an optical, electrostatic or other similar nature may be calibrated to provide an indication of smoke or particulate level expressed in units of Bosch or other suitable reference units. One such apparatus for measuring the level of particulates in the exhaust gas emissions from an internal combustion engine that is suitable for on-vehicle applications is disclosed in U.S. Pat. No. 4,456,883 entitled "Method And Apparatus For Indicating An Operating Characteristic Of An Internal Combustion Engine" by Bullis et al., which application was filed on Oct. 4, 1982 and issued on June 26, 1984 and is assigned to the assignee of the present application. Although not limited to diesel or compression ignition engines, considerations of exhaust smoke levels are more prevalent with such engines because of their characteristically higher levels of emitted particulates.

Numerous control systems have been developed for regulating the quantity of fuel admitted to an internal combustion engine and particularly to diesel engines. More specifically the fuel quantity control or metering member, such as a rack, of the diesel pump is variably limited, or stopped, in accordance with a control schedule. Generally speaking a particular maximum fuel flow or fuel flow limit is determinative of a corresponding torque limit for the engine. Thus, as used herein, the terms "torque limit" and "fuel flow limit" or "maximum fuel limit" will be considered to be synonymous. One example of a system for controlling the adjustment of a quantity-metering member of a fuel injection pump is disclosed in U.S. Pat. No. 4,357,920 wherein various operating parameters of a diesel engine are monitored and used to develop a signal which determines the instant limit of the fuel quantity-metering member. One of the values which may serve to limit the fuel quantity injected is a so-called "smoke characteristic" determined as a function of the speed, the fuel temperature and the taken-in quantity of air, the latter value being determined by the measurement of pressure and temperature in the intake manifold or by a direct measurement of the air quantity.

In yet another system disclosed in U.S. Pat. No. 4,502,437 for "Electrical Fuel Control System And Method For Diesel Engines" by James R. Voss, issued Mar. 5, 1985 and assigned to the same assignee as the present application, a system is disclosed for limiting the positioning of the fuel quantity-metering member (rack) in a manner intended to prevent or minimize puffs of smoke which may be emitted during gear-shifting of a turbocharged diesel engine. In that instance, two functions characteristic of the engine and turbocharger combinations being controlled are stored in a puff control memory and are used for the mathematical derivation and provision of a fuel quantity limiting signal as a function of engine speed and the actual positioning of the fuel-metering rack.

Another U.S. Pat. No. 4,223,654 for "Method and Apparatus for Controlling the Operation of a Diesel Engine" also discloses a system for limiting the amount of fuel admitted to the engine in dependence on engine speed and air mass flow data. That system makes additional corrections of the maximum amount of fuel based on air temperature and fuel temperature. Still further refinements include taking into account exhaust gas temperature and engine starting conditions. Indeed, a function generator is utilized for providing a maximum fuel quantity signal or value as a function of the engine speed and induction tube pressure. Although consideration is given to the appropriate function for providing maximum permissible fuel quantity associated with a particular speed and pressure while maintaining the exhaust below permissible smoke limits, that function becomes a preprogrammed constant in the function generator to be thereafter determined by engine speed and induction air pressure.

Existing control systems, although seeking to provide an optimized fuel limit or torque limit while maintaining engine operation within certain exhaust smoke limits, have heretofore relied upon a predetermined value determined as a function of existing engine conditions of speed, intake pressure, temperature and the like in an effort to attain that end. However, as certain characteristics of the engine change with time and wear, the predetermined functions may no longer be optimally suited to achieving the desired end. More specifically, changes in engine operating characteristics may result in the excessive emission of exhaust smoke with the passage of time. Alternatively, if the predetermined function is conservatively scaled to prevent such occurrence, the engine may not be permitted to operate at its maximum torque capabilities during the early stages of its life.

DISCLOSURE OF INVENTION

It is a principal object of the present invention to provide improved apparatus and method for controlling the torque or maximum fuel limit of an internal combustion engine. Included within this object is the provision of such torque limit control in a manner to achieve operation within predetermined exhaust smoke limits with miminum adverse impact on the torque control limit.

It is a further object of the present invention to provide an improved method and apparatus for controlling the fuel-quantity metering of a diesel engine in a manner which affords a maximum torque limit without exceeding a predetermined exhaust smoke limit.

It is an even further object of the present invention to provide an indication of a particular decline in engine operation.

According to the present invention, there is provided an improved method and apparatus for controlling the maximum fuel supply quantity to an internal combustion engine, such as a diesel, so as to afford a maximum torque limit without exceeding a predetermined exhaust smoke limit. Fuel supply means such as a fuel injection pump, responsive to a fuel quantity demand input and to a fuel quantity limit signal, supply to the engine the demanded quantity of fuel within a fuel quantity limit. The fuel quantity demand input may be provided directly mechanically to the pump by an operator or the like or it may be applied through the additional inclusion of electronic and/or electromechanical agencies. The fuel quantity limit signal acts either electrically to limit an electrical fuel quantity demand input signal or acts through electromechanical means to limit the mechanical response of a mechanical fuel quantity demand input. In either instance, the fuel quantity limit signal is developed by comparing the existing smoke level conditions in the exhaust stream emitted by the engine with a predetermined smoke limit value to ensure that the fuel quantity limit signal maintains the fuel quantity limit sufficiently high to achieve maximum torque without exceeding the smoke limit. An open loop preliminary fuel quantity limit signal is provided as a function of engine operating conditions such as speed in accordance with a predetermined schedule; however, the determination of the difference between the smoke limit and the actual smoke level is used to modify the preliminary fuel quantity limit signal in the direction which provides the objectives of maximum torque while remaining within smoke limits.

In accordance with a further aspect of the invention, the difference or margin between the predetermined permissible smoke limit and the actual smoke level is monitored and provision is made for alerting the operator when engine performance has deteriorated to the level at which excess fuel above the scheduled preliminary fuel quantity limit is no longer available. Such condition arises when the actual smoke level is at the smoke limit.

BEST MODE FOR CARRYING OUT THE INVENTION

Figure 1:
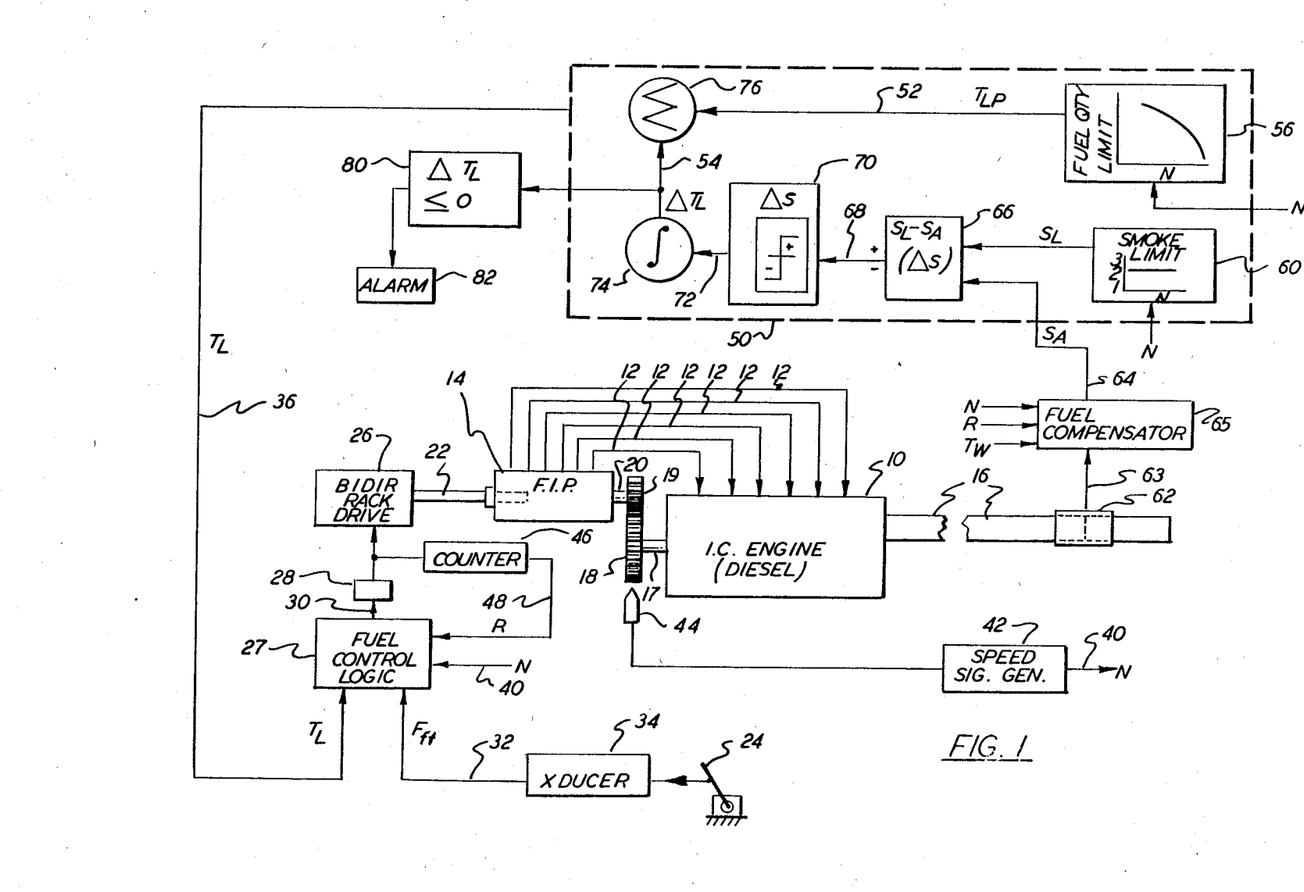
FIG. 1 is a schematic block diagram of a torque limit control system for a fuel pump and engine in accordance with the invention.
Figure 2A:
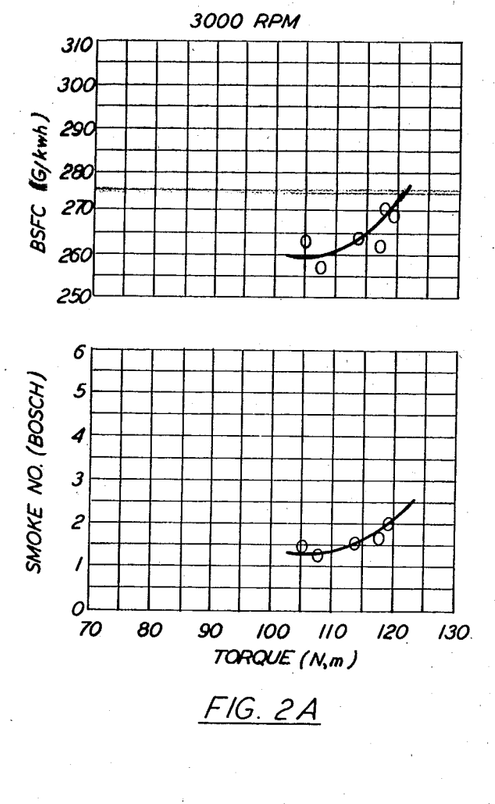
FIGS. 2A-2D each depict characteristic curves of fuel consumption and smoke versus torque at differing engine speeds.
Figure 2B:
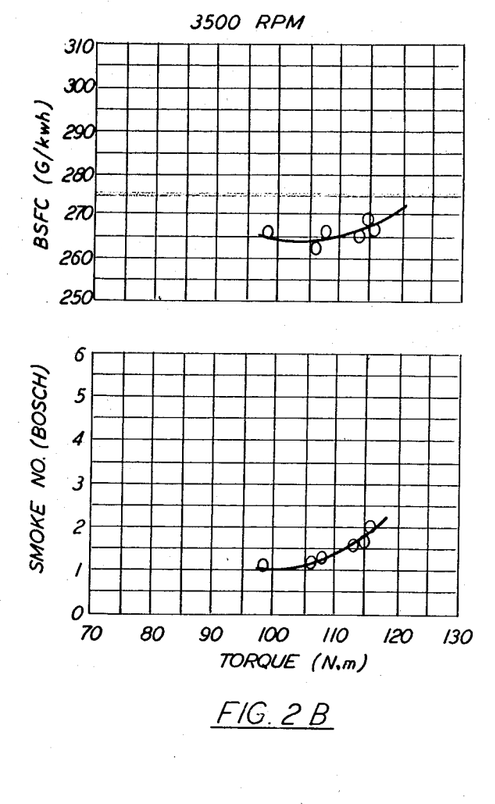
Figure 2C:
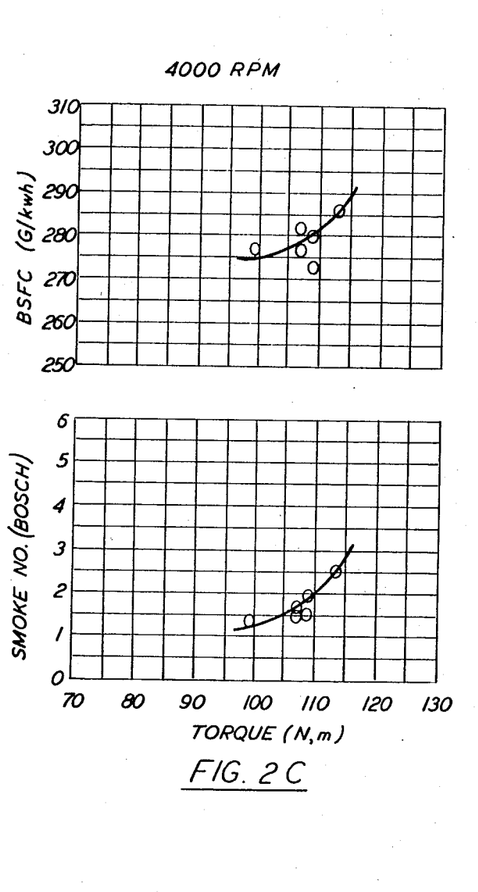
Figure 2D:
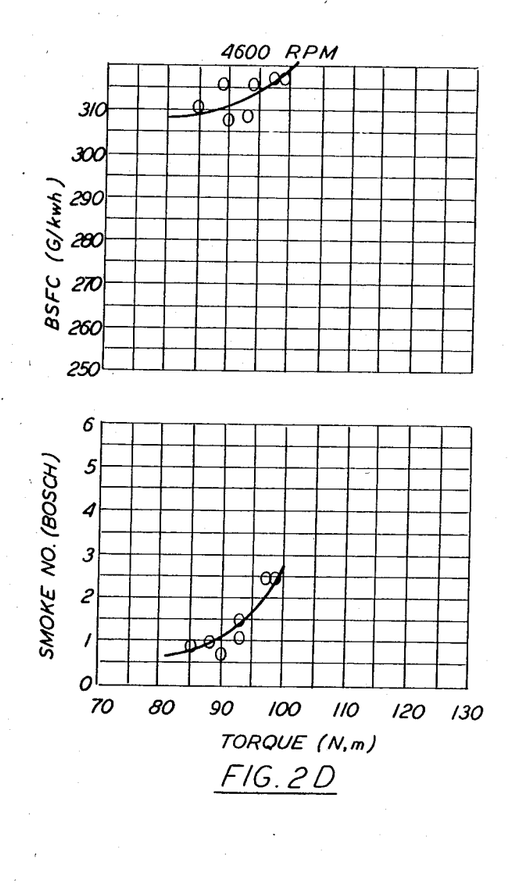

Referring to FIG. 1 there is illustrated a system for controlling the maximum torque or fuel quantity to an internal combustion engine such as diesel engine 10. Fuel is supplied to the engine 10 by a conventional fuel injection pump 14 via 6 respective fuel lines 12. The fuel is combined with intake air (not shown) and is combusted. The resulting exhaust gases are discharged from the engine via exhaust pipe 16. The fuel injection pump 14 is characteristically driven by the engine 10 via engine drive shaft 17, engine drive gear 18, pump drive gear 19, and pump drive shaft 20. The particular pump illustrated in FIG. 1 includes a fuel control rack 22 which is longitudinally positionable in adjusting in a known manner the quantity of fuel supplied by pump 14 to the engine 10.

The torque provided by engine 10 is principally a function of the quantity of fuel delivered to the engine. While on the one hand it may be desirable to extend the torque range of an engine by increasing the fuel quantity supplied, it is necessary on the other hand to provide certain limits to the quantity of fuel supplied in order to maintain a suitable operating speed and to prevent operation of the engine beyond certain inherent design limits. A fuel quantity demand input, as for instance initiated and/or provided by a control lever or foot pedal 24, may act on the fuel control rack 22 directly or via intermediate electronics as illustrated in FIG. 1 to cause the fuel rack 22 to move in a manner so as to satisfy the demanded fuel quantity. However, to ensure that the demanded fuel quantity or torque does not exceed the design torque limit, means are provided for establishing a fuel quantity limit or torque limit beyond which the rack 22 may not be actuated. Typically, that torque or fuel quantity limit is a variable function of engine speed.

In the embodiment illustrated in FIG. 1, the rack 22 is actuated electromechanically in a manner similar to that described in the aforementioned U.S. Pat. No. 4,502,437 to which reference may be made for additional detail to the extent consistent and necessary. Specifically, a bidirectional stepping motor actuator 26 is capable of longitudinally reciprocating the rack 22 in stepwise fashion in response to a control signal applied thereto from fuel control logic 27 via stepping motor control circuit 28. The output signal 30 from fuel control logic 27 is indicative of whether a change in the rack position is to be made and if so in which direction.

The fuel control logic 27 characteristically receives several inputs, including an input demand signal $F_{ft}$, a fuel quantity limit or torque limit signal $T_L$, a rack position signal R and an engine speed signal N. The logic 27 may additionally include other signals, not shown, which affect the positioning of the rack during conditions of high and low idle, etc. However, in accordance with the invention the consideration will be limited to the demand signal $F_{ft}$ and the torque limit signal $T_L$.

The fuel quantity demand signal $F_{ft}$ appears on line 32 as the output of a position transducer 34 operatively associated with the foot pedal 24. The transducer 34, which may be a potentiometer, indicates the position of the foot pedal 24 and thus represents the demanded fuel quantity.

The fuel quantity limit signal $T_L$ appearing on line 36 is developed and provided in a manner to be described hereinafter in greater detail, but is indicative of a limit to the quantity of fuel to be supplied as a function of the engine speed and, in accordance with the invention as a function of the level of smoke in the exhaust emitted from engine 10.

A signal N proportional to engine speed is also supplied to the fuel control logic 27. The speed signal N appears on line 40, has the output of a speed signal generator 42 which in turn receives its input from a transducer 44. The transducer 44 is positioned to sense the passage of teeth on an engine gear 18 and provide respective electrical signals in a known manner.

The output pulses from stepping motor control circuit 28 are extended to a counter 46 which increases or decreases its count accordingly, and thereby maintains and stores a number indicative of the position of rack 22. The output R of counter 46 represents the rack position and appears on line 48 which is applied as an input to control logic 27. Thus the fuel control logic 27 will be responsible for effecting stepping of the control rack 22 in one direction or the other when the controlling input signal differs from the actual rack position R, and that stepping will continue until the rack position R agrees with the controlling input signal.

The circuitry for providing or generating the fuel quantity limit signal $T_L$ on line 36 is generally embraced by the broken line 50, and includes circuitry for providing an open-loop, preliminary fuel quantity limit signal $T_{LP}$ appearing on line 52 and circuitry for providing a compensating fuel quantity limit signal $\Delta T_L$ on line 54 which adaptively adjusts the preliminary signal $T_{LP}$ to provide the fuel quantity limit signal $T_L$. This circuitry is similar in some respects to that disclosed in the copending U.S. Pat. No. 4,485,794 entitled "Method And Apparatus For Controlling Diesel Engine Exhaust Gas Recirculation Partly As A Function Of Exhaust Particulate Level", filed Oct. 4, 1982 by the same inventors and issued on Dec. 4, 1984 and being owned by the same assignee as the present application. The circuitry 50 for providing the fuel quantity limit signal $T_L$ and the fuel control logic 27 may suitably be provided by a microprocessor or microcomputer including appropriate input and output signal conditioning circuitry and appropriate signal storage capacity.

More specifically, the preliminary signal $T_{LP}$ of the present invention is provided from a set of predetermined stored values of the fuel quantity limit. A number of fuel quantity limit values are stored at predetermined addresses in a read-only memory (ROM) 56 as a function of engine operating condtions, specifically engine speed N. Stated another way, for each of a plurality of engine speed conditions there is stored in ROM 56 a respective preliminary fuel quantity limit or torque limit control signal. The values of these preliminary fuel quantity limit control signals are predetermined for storage in the ROM 56 in an empirical manner by mapping the performance of a representative engine. The preliminary fuel quantity limit values stored in ROM 56 are preferably selected such that, at least early in the life of an engine, the resulting exhaust smoke over the relevant speed range will be less than some predetermined limit and the torque output of the engine will be lower than permissible. This, of course, means that the preliminary fuel quantity limit signal $T_{LP}$ will be smaller or less than might otherwise be desired, even though the desired fuel quantity limit signals might also provide operation which remains within a smoke limit. However, it is a relatively easy value to assign or establish, and the subsequent effect of the compensating fuel quantity limit signal $\Delta T_L$ on line 54 assures that the fuel flow limit signal $T_L$ on line 36 is the maximum possible while remaining within a smoke limit.

Attention will be turned briefly to the characteristic curves of FIGS. 2A-2D which illustrate fuel consumption versus torque (upper plot) and smoke level versus torque (lower plot for each of four engine speeds, i.e., 3000, 3500, 4000 and 4600 rpm, for a small, high-speed, naturally aspirated diesel engine. It will be noticed that at each speed, as torque, (fuel quantity) increases, so too do fuel consumption and importantly, the exhaust smoke level. It will be understood that such characteristic curves differ somewhat for other diesel engines.

Figure 3:
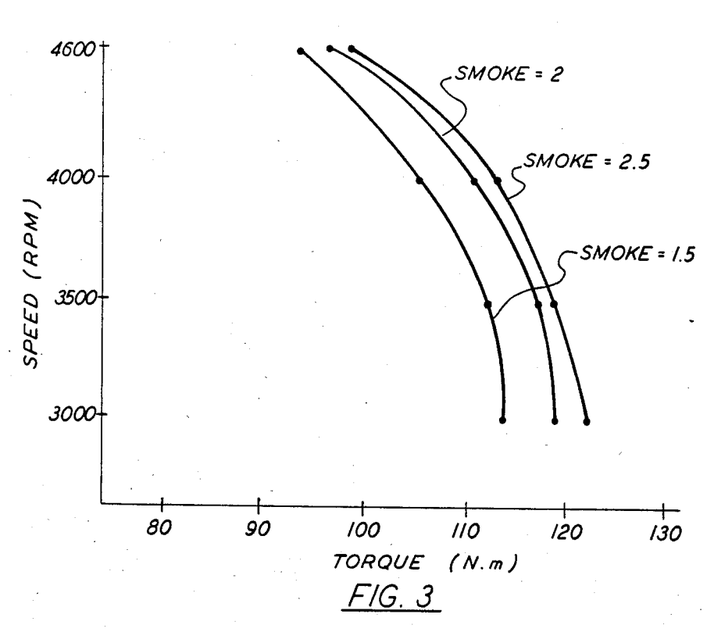
FIG. 3 shows an array of curves derived from the data of FIGS. 2A-2D and illustrating differing smoke levels as a function of engine speed and torque.

Referring to the array of curves in FIG. 3 and derived from the data of FIGS. 2A-2D, there are illustrated differing smoke levels as a function of engine speed and torque. It will be noted that if the design objective is to control exhaust smoke level such that it does not exceed 2 Bosch over the speed range from 3000 rpm to 4600 rpm, the maximum fuel limit or torque value at a particular speed may be as large as that on the "SMOKE=2" curve, but it may not exceed that value. However, in accordance with the earlier mentioned objective of establishing conservative values for the preliminary fuel quantity limit control signal in ROM 56, those values might more nearly approximate the values along the "SMOKE=1.5" curve, for instance.

Returning to the discussion of circuitry 50 of FIG. 1, consideration is now given to the circuitry for providing the compensating fuel quantity limit signal $\Delta T_L$ which adaptively adjusts or corrects the $T_{LP}$ signal 52 to provide the $T_L$ signal 36. As in the case of the stored values of the preliminary fuel quantity limit signals $T_{LP}$, a map of predetermined smoke level limit signals $S_L$ is stored in a ROM 60 as a function of engine speed N. The smoke level limit signals are typically established by the engine or vehicle manufacturer so as to provide a measure of exhaust smoke control which is commercially, governmentally and/or aesthetically acceptable. These values may vary somewhat from manufacturer to manufacturer and country to country. Moreover, the smoke limit may vary somewhat over the speed range, however, in the illustrated example the value is presumed to be constant at a value of 2 Bosch over the relevant speed range.

Commensurate with the provision of the smoke limit value $S_L$ from ROM 60, a value $S_A$ of the actual exhaust smoke level is also provided, on line 64, using any suitable on-line, smoke-level monitoring device. In the present device, the smoke level is sensed by a smoke or particulate sensor 62, described in the aforementioned U.S. Pat. No. 4,485,794, which inductively senses the passage of the charged smoke particles in the exhaust gas stream. Typically, the current induced in the sensor 62 by the passage of particle packets in the exhaust gas is proportional to the particulate population and appropriate signal development circuitry (not shown) provides a signal on line 63 which is a measure of the particulate level in the exhaust gas stream. If the smoke limit values $S_L$ in ROM 60 happen to be expressed in terms of opacity-derived smoke, it will be necessary for the particulate level signal 63 to be scaled or calibrated such that $S_A$ corresponds with the opacity-derived values.

This operation may be provided by the signal development circuitry if the scaling factor remains constant.

While the aforementioned scaling of the particulate-derived smoke signal to an opacity-derived smoke value need only be done once if the relationships between the two are constant for various conditions, such is not the case at least for differing types of fuel. Specifically, different fuels having differing amounts of aromatics will generate different levels of particulates even though there may be no change in the opacity-derived value. Therefore, it is desirable to rescale or recalibrate the particulate-derived smoke signal 63 during the course of normal vehicle operation, as through the use of the "fuel compensation" circuitry 65. Circuitry 65 is responsive to the particulate signal 63, and to the speed signal N, a load signal represented by the rack position count R and to an optional signal $T_W$ indicative of the engine water temperature for scaling the actual smoke signal $S_A$. For instance, each time the engine is operated, circuitry 65 is operative to identify an operating condition of speed N, load R and possibly water temperature $T_W$ at which the optically-measured smoke output is known to be near zero, but of finite value. A master particulate value for this opacity condition will have been initially stored in circuit 65. The then-existing value of the particulate-derived smoke signal 63 is compared with the master value and any difference is then used to modify signal 63 such that it is representative of an opacity-derived value before it is supplied as smoke signal $S_A$.

The value of the actual smoke level $S_A$ is compared, at comparator 66, with the smoke limit signal value $S_L$ from ROM 60 to determine the error or difference. The output of comparator 66 is represented by lead 68 and comprises an error or difference signal which may have a positive or negative sense, depending upon whether the actual smoke level $S_A$ is less than or (presumably temporarily) greater than the smoke limit $S_L$. A standardized difference signal $\Delta S$ of positive or negative sense is provided in a known manner as represented by the function block designated 70. The sampling frequency of the system is such that the standardized positive or negative error or difference signals appearing on lead 72 may then be integrated, as represented by integrator 74, to provide the compensating signal $\Delta T_L$ appearing on lead 54.

The compensating signal $\Delta T_L$ is constituted by the integrated or averaged values of several smoke limit error signals $\Delta S$ to minimize the effects of temporary perturbations in the actual smoke level. This signal is now representative of the value which, when summed with the preliminary fuel quantity limit signal $T_{LP}$ at summer 76, will result in the final fuel quantity limit signal $T_L$ on line 36 having a value that is the maximum possible without exceeding the predetermined smoke level limit. Assuming the actual smoke level $S_A$ is less than the smoke limit $S_L$, the compensating signal $\Delta T_L$ on line 54 will have a positive value and will be added to the preliminary fuel quantity limit signal $T_{LP}$ to provide $T_L$. Conversely, if the actual smoke should equal or exceed the predetermined smoke limit, the compensating signal $\Delta T_L$ will be either nil or will have a negative sense and will thus not increase the fuel quantity limit signal $T_L$ on line 36 beyond the conservative value of the preliminary fuel quantity limit signal $T_{LP}$. In fact, if the compensating signal $\Delta T_L$ is negative, it will serve to lower the fuel quantity limit signal $T_L$ below that of the preliminary signal $T_{LP}$, thus decreasing the maximum available torque at those operating conditions.

In the early life of an engine, it would be expected that the aforedescribed control system would provide relatively high fuel quantity limits, thereby allowing relatively high torques without exceeding the smoke limit. As conditions changed, as for instance due to engine aging, a change in fuel composition and/or temperature and/or a significant change in air pressure at differing altitudes, the engine may combust its fuel less efficiently and thereby produce increased amounts of smoke. However, the aforedescribed control assures that the predetermined smoke limit is not exceeded other than for brief intervals whereupon it is corrected or adjusted by the adaptive action of the control system.

As a further facet of the invention, provision is also made for alerting the vehicle operator and/or maintenance personnel when there no longer remains a positive margin between the actual smoke level and the smoke limit. The existence of such margin indicates that the fuel quantity limit settings $T_L$ will exceed the conservative preliminary values $T_{LP}$. On the other hand, the absence or more importantly, the reversal of that margin signifies that the engine is operating at its smoke limit and may also have a fuel quantity or torque limit $T_L$ which is even less than $T_{LP}$.

Accordingly, appropriate circuitry represented by the function block 80, is provided for monitoring the sense of the margin between the predetermined smoke limit and the actual smoke level and for activating a suitable alarm 82 if the margin is less than a certain value for a predetermined period, as for instance if the margin is negative and possibly also if the margin is nil. Stated another way, if the integrated value of $\Delta S$, i.e., $\Delta T_L$, is equal to or less than (i.e., more negative than) 0, then the alarm 82 may be activated. Alarm 82 may be audible and/or visual or otherwise sensible and may serve to alert a person to the condition without taking any further control action. Moreover, because the system may occasionally experience temporary negative smoke margins due to transient conditions, it may be desirable to alarm only if the condition persists for some interval or recurs some number of times within a predetermined interval.

Figure 4:
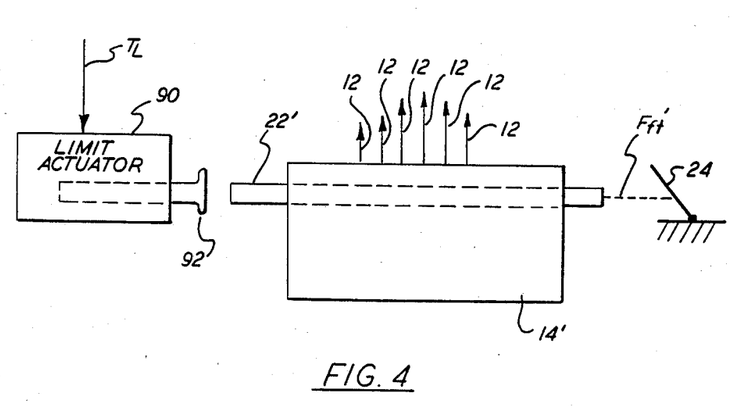
FIG. 4 is a functional block diagram of an alternative torque limiting arrangement for a fuel injection pump.

Although the invention has been described with reference to the embodiment illustrated in FIG. 1 in which the fuel quantity limit signal $T_L$ and the demand input signal $F_{fi}$ are compared electronically such that only the lower value appears at the output of logic 27 for controlling the position of rack 22, it will be understood that other fuel supply mechanisms might alter that arrangement without departing from the scope of the invention. For instance, referring to FIG. 4 there is illustrated a fuel injection pump 14' and fuel quantity control rack 22' which may be similar to pump 14 and rack 22 of FIG. 1. However, the demand input $F_{fi}'$ is now applied mechanically directly to the rack 22', and the limiting of the fuel quantity is obtained by extending the fuel quantity limit signal $T_L$ to a limit actuator mechanism 90 which responds by positioning an abutment 92 so as to physically limit the travel of rack 22'. The limit actuator 90 may be an electromechanical actuator and may include some signal conditioning circuitry. The linkage between the foot pedal or control lever 24 and the rack 22' is such that it may yield when the rack comes to a hard stop against the abutment 92. Although not shown, an indication of rack position also will be required in this implementation in the manner of the FIG. 1 embodiment and is implied.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of the invention, that which is claimed as new and desired to be secured by Letters Patent of the United States is:

1. Apparatus for controlling the maximum fuel supply quantity to an internal combustion engine emitting an exhaust gas stream which may contain electrically-charged particulate, including fuel supply means responsive to a fuel quantity demand input and to a fuel quantity limit signal for supplying to the engine the demanded quantity of fuel within the quantity limit, comprising:

a probe adapted to be mounted in operative association with the exhaust gas stream at a sensing station downstream of the engine for inductively sensing the electrically charged particulate in the exhaust gas stream to provide an electrical signal indicative of the particulate level in the exhaust gas stream;

circuit means responsive to said electrical signal indicative of the particulate level in the exhaust gas stream and to a predetermined correlation between a said particulate level signal and an opacity-derived smoke level signal for providing a sensed smoke level signal scaled to an opacity-derived smoke value, said predetermined correlation between a said particulate level signal and an opacity-derived smoke level signal being determined for a particular fuel and wherein said circuit means is further responsive to a predetermined set of engine operating conditions each time the engine is operated to modify said predetermined correlation as needed to compensate for variations in engine fuel characteristics;

means for providing said fuel quantity demand input; and signal generating means responsive to engine operating condition signals including at least said sensed smoke level signal for providing said fuel quantity limit signal.

2. In an internal combustion engine which emits an exhaust gas stream which may contain electrically-charged particulate, and including fuel supply means responsive to a fuel quantity demand input and to a fuel quantity limit signal for supplying to the engine the demanded quantity of fuel within the quantity limit, the method for controlling the maximum fuel supply quantity to the engine comprising the steps of:

sensing the electrically-charged particulate in the exhaust gas stream at a sensing station downstream of the engine and providing an electrical signal indicative of the particulate level in the exhaust gas stream;

scaling said electrical signal indicative of the exhaust particulate level in accordance with a predetermined correlation between a said particulate level signal and an opacity-derived smoke level signal for providing a sensed smoke level signal scaled to an opacity-derived smoke value, said predetermined correlation between a said particulate level signal and an opacity-derived smoke level signal being determined for a particular fuel and including the further step of modifying said predetermined correlation in response to a predetermined set of engine operating conditions each time the engine is operated to compensate for variations in engine fuel characteristics;

providing said fuel quantity demand input; and generating a said fuel quantity limit signal in response to engine operating condition signals including at least said sensed smoke level signal.

3. The apparatus of claim 1 including means for generating a signal proportional to engine speed and wherein said fuel quantity limit signal generating means is responsive also to said engine speed signal.

4. The apparatus of claim 3 wherein said fuel quantity limit signal generating means includes:

means for generating a preliminary fuel quantity limit signal in response to and as a function of at least said engine speed signal;

means for generating a smoke limit signal representative of a predetermined smoke limit;

means for comparing said sensed smoke level signal with said smoke limit signal and providing an error signal as a function of a difference therebetween; and compensating means responsive to said error signal for providing adjustment of said preliminary fuel quantity limit signal thereby to provide said fuel quantity limit signal, said adjustment of said preliminary fuel quantity limit signal by said compensating means being such as to maximize the fuel quantity limit signal within said predetermined smoke limit.

5. The apparatus of claim 4 wherein said means for generating said preliminary fuel quantity limit signal and said means for generating said smoke limit signal comprise memory means having values of said preliminary fuel quantity limit signal and one or more values of said smoke limit signal stored therein, at least said preliminary fuel quantity limit signal values being stored as a function of engine speed.

6. The apparatus of claim 5 wherein said smoke limit signal values are also stored in said memory means as a function of engine speed.

7. The apparatus of claim 4 including means responsive to said error signal for providing a sensible alarm indication when the difference between said smoke limit signal and said sensed smoke level signal averaged for a predetermined period is less than a predetermined value.

8. The apparatus of claim 7 wherein said alarm indication is provided when said difference value is either nil or of negative sense.

9. The method of claim 2 wherein said internal combustion engine is of the compression-ignition type and including the step of generating a signal proportional to engine speed, said engine speed signal being a further one of said engine operating signals for generating said fuel quantity limit signal.

10. The method of claim 9 wherein said step of generating said fuel quantity limit signal comprises:

providing a preliminary fuel quantity limit signal in response to and as a function of at least said engine speed signal;

generating a smoke limit signal representative of a predetermined smoke limit;

comparing said sensed smoke level signal with said smoke limit signal and providing an error signal as a function of a difference therebetween; and adjusting said preliminary fuel quantity limit signal as a function of said error signal to provide said fuel quantity limit signal, said adjusting of said preliminary fuel quantity limit signal being toward maximizing said fuel quantity limit signal within said predetermined smoke limit.

11. The method of claim 10 including the further step of generating an alarm indication when said fuel quantity limit signal equals or is less than said preliminary fuel quantity limit signal.

* * * * *